(12) United States Patent
Hara et al.

(10) Patent No.: US 7,723,661 B2
(45) Date of Patent: May 25, 2010

(54) SOLID-STATE IMAGING DEVICE WITH COLUMN AMPLIFIER

(75) Inventors: Kunihiko Hara, Osaka (JP); Hiroshi Kubo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/837,863

(22) Filed: Aug. 13, 2007

(65) Prior Publication Data
US 2008/0048098 A1  Feb. 28, 2008

(30) Foreign Application Priority Data
Aug. 23, 2006  (JP) .............................. 2006-226903

(51) Int. Cl.
*H01L 27/00* (2006.01)
(52) U.S. Cl. ................. 250/208.1; 346/222.1
(58) Field of Classification Search .............. 250/208.1; 348/222.1, E5.031
See application file for complete search history.

(56) References Cited

U.S. PATENT DOCUMENTS

| | | |
|---|---|---|
| 5,296,696 A | 3/1994 | Uno |
| 7,224,390 B2 * | 5/2007 | Kokubun et al. ......... 250/208.1 |
| 2005/0194520 A1 | 9/2005 | Koseki |
| 2008/0030595 A1 * | 2/2008 | Murakami et al. ....... 348/222.1 |

FOREIGN PATENT DOCUMENTS

| | | |
|---|---|---|
| JP | 5-207220 | 8/1993 |
| JP | 2005-252529 | 9/2005 |

* cited by examiner

*Primary Examiner*—Seung C Sohn
(74) *Attorney, Agent, or Firm*—Hamre, Schumann, Mueller & Larson, P.C.

(57) ABSTRACT

It is an object to obtain a solid-state imaging device that can reduce a variation in an electric current that flows between an amplifier power supply and ground wiring in a column amplifier, which occurs in accordance with an input signal level, without degrading manufacture and operation tolerances in terms of photoelectric conversion characteristics of the solid-state imaging device. A solid-state imaging device includes: a pixel array in which imaging pixels are arranged in row and column directions; a plurality of vertical signal lines, each of which commonly outputs signals from part of the imaging pixels that is aligned in each column of the pixel array; and a plurality of column amplifiers that are provided in a one-to-one correspondence with the plurality of vertical signals lines. In the solid-state imaging device, between a column amplifier power supply and a ground in each of the plurality of column amplifiers, a current generating circuit is provided that generates a correction current in such a direction as to cancel out a variation in an operation current of each of the plurality of column amplifiers.

11 Claims, 16 Drawing Sheets

SOLID-STATE IMAGING DEVICE WITH COLUMN AMPLIFIER

BACKGROUND OF THE INVENTION

1. Field of the Invention

The present invention relates to a solid-state imaging device, and particularly relates to a solid-state imaging device that can provide high quality images even when capturing an image of a subject with high brightness, and allows large tolerances in manufacture and operational conditions.

2. Description of Related Art

In a MOS type solid-state imaging device, for reading out image signals from a pixel array in which imaging pixels are arranged in a matrix form, generally, an analog memory is provided in each column, and signals are read out from the imaging pixels on a row-by-row basis, and then, the signals kept in the column memories are outputted serially to the outside. Further, it often has been the case with a conventional example of a MOS type solid-state imaging device that a column amplifier is inserted between a pixel array and a column memory. The reason for this is that in a serial readout portion, since a high-speed operation is required therein, noise suppression hardly can be achieved, while in a column circuit portion that operates at low speed, signal amplification can be performed to provide an image signal having a high S/N ratio.

In a conventional solid-state imaging device, with respect to a signal potential V1 obtained when a floating diffusion portion (FD) of an imaging pixel is in a reset state and a signal potential V2 obtained in a state where, after the FD is reset, an electric charge generated in a photodiode (PD) is transferred to the FD, a difference between these two signal potentials is detected and amplified. This difference between the two signal potentials represents a light irradiation amount detected by the PD.

FIG. 15 shows a first example of a circuit configuration of a column amplifier in such a conventional solid-state imaging device. In this first example, first, by means of a signal from a column amplifier reset signal line 27, a column amplifier reset transistor 24 is turned on, and in this state, from an imaging pixel, a first potential V1 is inputted as a column amplifier input potential 102. A column amplifier output potential 26 obtained at this time is indicated as Vamprst. Next, in a state where the column amplifier reset transistor 24 is turned off, a signal V2 is inputted from the imaging pixel, and the column amplifier output potential 26 changes to Vamprst+(C1/C2)(V2−V1). This means that an imaging pixel signal corresponding to a light irradiation amount is amplified at a gain of C1/C2. Herein, C1 denotes a column amplifier input capacitance 21, and C2 denotes a column amplifier feedback capacitance 101. In FIG. 15, reference numeral 30 denotes a column amplifier power supply, 23 denotes a column amplifier load transistor, 22 denotes a column amplifier driving transistor, 25 denotes a gate electrode, and 31 denotes a ground (JP 05(1993)-207220 A).

Furthermore, FIG. 16 shows a second example of the circuit configuration of the column amplifier included in the conventional solid-state imaging device. This configuration differs from the configuration shown in FIG. 15 in that a column amplifier bias potential 28 is supplied to a column amplifier load transistor 23 so that a load of a grounded-source amplifier is a constant current source, and in that a clip transistor 104 is connected to an amplifier output portion. An output limit potential 103 is supplied to the clip transistor 104, thereby providing an effect of being able to avoid a phenomenon in which an amplifier output level rises to such an extent that the column amplifier load transistor 23 cannot operate in a saturation region, which hampers a constant current operation. As in the case of the conventional solid-state imaging device, with respect to a pixel signal corresponding to a light irradiation amount that is a difference between two signals V1 and V2 from an imaging pixel, this column amplifier also has the function of amplifying the pixel signal at a gain of C1/C2 that is a ratio between a column amplifier input capacitance 21 and a column amplifier feedback capacitance 101 (JP 2005-252529 A).

Now, the following discusses peculiarities of a power supply layout pattern of a MOS type solid-state imaging device in which an amplifier is provided in each column. FIG. 17 shows a typical layout configuration. A MOS type solid-state imaging device in which an amplifier is provided in each column has the following configuration. That is, a column amplifier 109 is disposed in a one-to-one correspondence with a vertical signal line 108 in each column of a pixel array 1 in which a plurality of imaging pixels 20 are arranged in a matrix form, and in order to transmit image signals to a signal output portion 110, a column amplifier-arranged portion 3 inevitably has a configuration in which a large number of the column amplifiers 109 are arranged laterally. With respect to each of the large number of the column amplifiers 109 thus arranged, amplifier power is supplied from an amplifier power supply pad 105, and a ground potential is supplied through a ground pad 106. This requires that wiring for these column amplifiers 109 be extended from each of the pads for a distance in a lateral direction, such that the degree of the influence of a parasitic resistance 107 may become too large to be negligible.

Furthermore, in the column amplifier in the conventional solid-state imaging device described above as the first example, it is inevitable that an operation current of the column amplifier changes considerably in accordance with an input signal level. Therefore, for example, considering the case of capturing an image of a subject whose brightness is high only in a central portion thereof, in a column amplifier corresponding to the central portion, when a signal V2 from a pixel is inputted, an input potential of the column amplifier becomes high to reduce an operation current, so that an applied voltage to each of the column amplifiers positioned in a peripheral portion of the column amplifier deviates from a desired voltage value. Then, in each of these column amplifiers in the peripheral portion, a difference in applied voltage may occur between when a reset signal V1 is inputted and when an optical signal V2 is inputted, resulting in the occurrence of a deviation in amplifier output to cause a deviation in black level between the right and left sides of the subject with high brightness, which has been disadvantageous.

Furthermore, in the column amplifier in the conventional solid-state imaging device described above as the second example, by the function of a clip circuit, the transistor that functions as the constant current source operates only in a saturation region, thereby allowing a variation in operation current of the amplifier to be reduced. However, other problems may occur such as an operation range of the column amplifier being narrowed due to a variation in threshold value of the clip transistor, and characteristics changing when an output of the column amplifier approaches a clip level, thus making it difficult to secure a sufficient manufacture tolerance. Moreover, it also has been disadvantageous in that photoelectric conversion characteristics also may change as a result of a variation in threshold value due to a variation in ambient temperature.

SUMMARY OF THE INVENTION

With the foregoing in mind, it is an object of the present invention to obtain a solid-state imaging device that can reduce a variation in an electric current that flows between an amplifier power supply and ground wiring in a column amplifier, which occurs in accordance with an input signal level, without degrading manufacture and operation tolerances in terms of photoelectric conversion characteristics of the solid-state imaging device.

In order to solve the above-described problems, a solid-state imaging device according to the present invention includes: a pixel array in which imaging pixels are arranged in row and column directions; a plurality of vertical signal lines, each of which commonly outputs signals from part of the imaging pixels that is aligned in each column of the pixel array; and a plurality of column amplifiers that are provided in a one-to-one correspondence with the plurality of vertical signals lines. In the solid-state imaging device, between a column amplifier power supply and a ground in each of the plurality of column amplifiers, a current generating circuit is provided that generates a correction current in such a direction as to cancel out a variation in an operation current of each of the plurality of column amplifiers.

According to this configuration, using an electric current generated by the current generating circuit, the solid-state imaging device according to the present invention can reduce a variation in an electric current that flows between a column amplifier power supply and a ground without exerting an influence upon characteristics of the column amplifier. Thus, a solid-state imaging device can be realized that, even when capturing an image of a subject with high brightness, prevents the occurrence of a deviation in black level at a periphery of the subject, and has high manufacture and operation tolerances.

In the above-described solid-state imaging device according to the present invention, it is preferable that, with respect to a current value that is a sum of values of the operation current and the correction current, a variation in the current value that occurs in accordance with a level of an input signal inputted to each of the plurality of column amplifiers is smaller than a variation in the operation current. According to this configuration, when an operation current of a column amplifier changes due to an input signal of the column amplifier, such as when an image of a subject with high brightness is captured, the influence upon other column amplifiers can be reduced reliably.

Furthermore, in the solid-state imaging device according to the present invention, it is preferable that a bias potential generating circuit that applies a bias potential to the current generating circuit has a circuit configuration similar to a circuit configuration of each of the plurality of column amplifiers. According to this configuration, an electric current generated in a current generating circuit in accordance with a variation in operation current of a column amplifier can be controlled easily.

Moreover, it is preferable that: in accordance with a potential at one or a plurality of nodes in each of the plurality of column amplifiers, the current generating circuit switches between two or more levels of the correction current; levels of the correction current are switched relative to an output of the bias potential generating circuit; and the current generating circuit is configured so that a constant electric current is passed through the current generating circuit. According to these configurations, a current generating circuit can be adjusted easily and reliably.

In addition, it is preferable that: a function of switching between ON/OFF states of the current generating circuit itself is provided; the ON/OFF states of the current generating circuit itself are switched based on a level of an input signal or an output signal of each of the plurality of column amplifiers; and the device further includes an analog signal processing portion that includes a gain function and a control portion that controls the device as a whole, and the ON/OFF states of the current generating circuit itself are switched in accordance with gain setting by the analog signal processing portion. According to these configurations, power consumption in a current generating circuit can be reduced.

DETAILED DESCRIPTION OF THE INVENTION

Hereinafter, the solid-state imaging device according to the present invention will be described by way of embodiments with reference to the appended drawings.

First Embodiment

Figure 1:
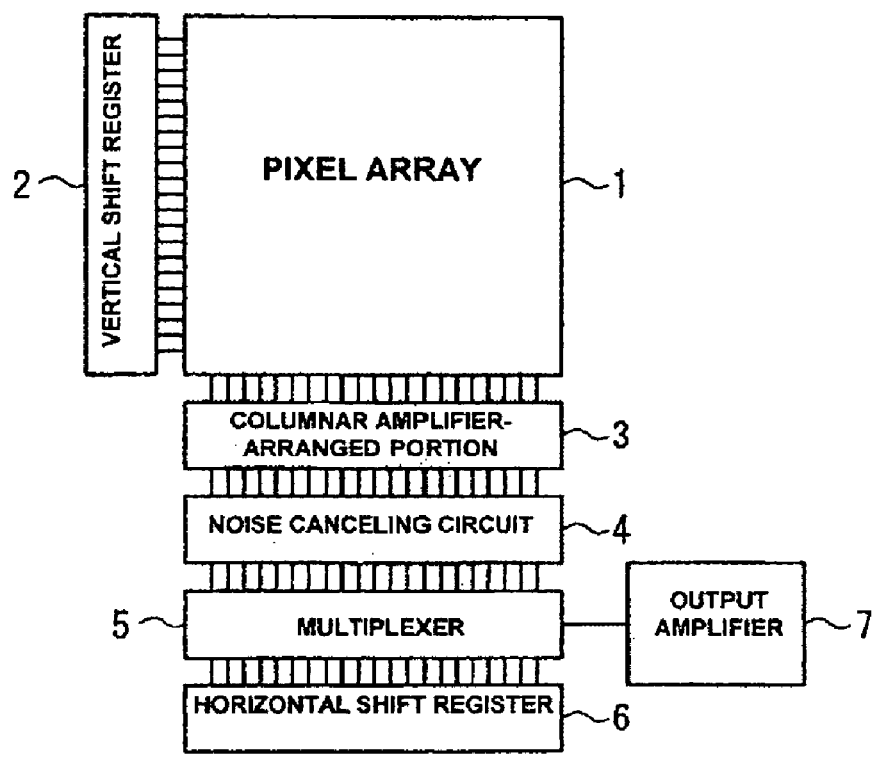
FIG. 1 is a block diagram showing a solid-state imaging device according to a first embodiment of the present invention.

FIG. 1 is a block diagram of a solid-state imaging device according to a first embodiment of the present invention.

In a pixel array 1 in which imaging pixels are arranged in a matrix form, a resetting operation, a charge accumulation operation, and a readout operation are performed on a row-by-row basis by a vertical shift register 2. Herein, each of the signals read out on the row-by-row basis is amplified by a column amplifier that is disposed in a column amplifier-arranged portion 3 in a one-to-one correspondence with a signal line in each column, and a value obtained by canceling offset variations of the amplifier is kept in a noise canceling circuit 4. Every set of pixel signals obtained from one row, which has been kept in the noise canceling circuit 4, is selected by a horizontal shift register 6 and is outputted sequentially via a multiplexer 5 and an output amplifier 7.

Figure 2:
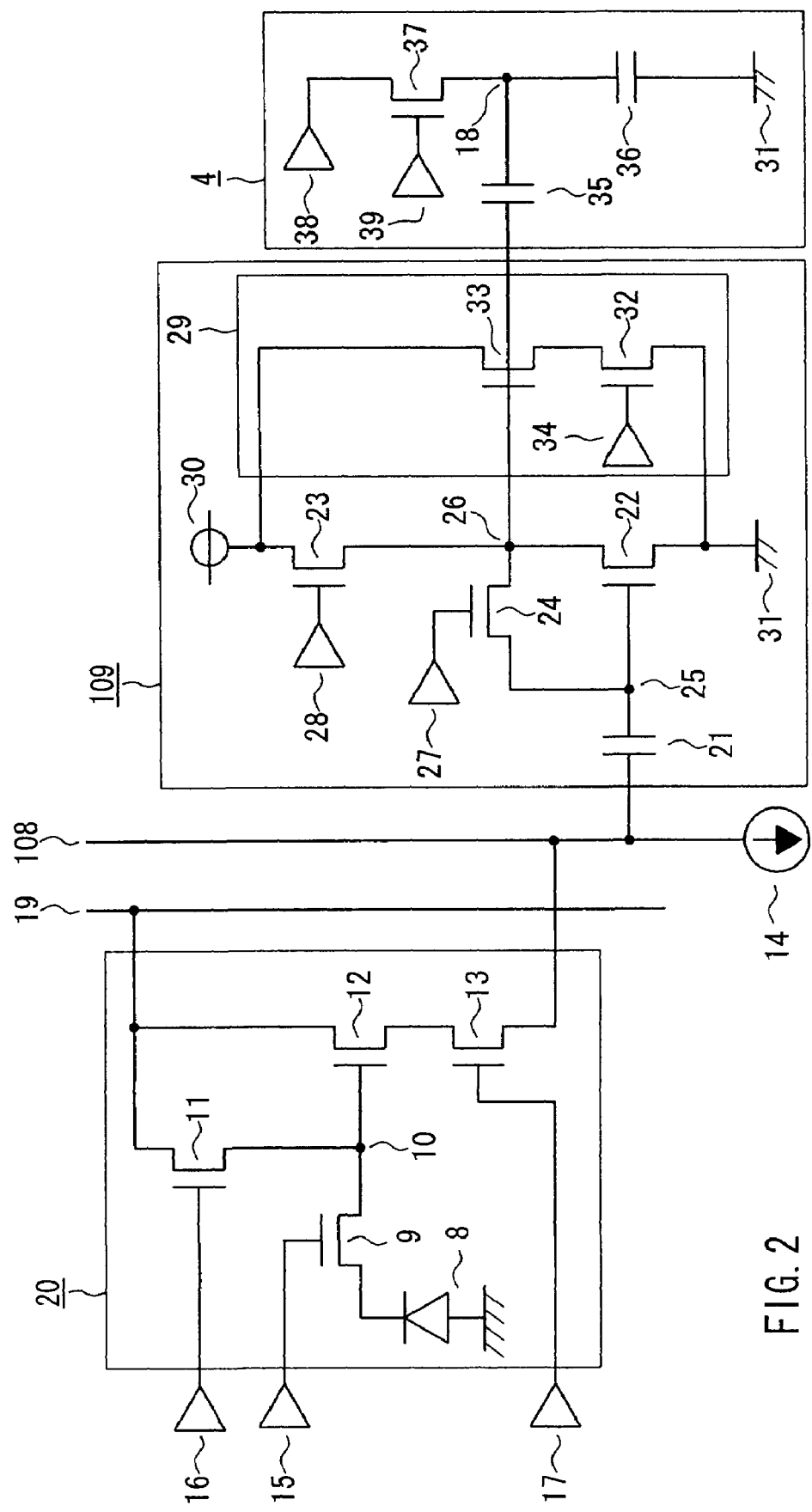
FIG. 2 is a circuit diagram showing a main portion of the solid-state imaging device according to the first embodiment of the present invention.

FIG. 2 is a block circuit diagram specifically showing respective configurations of an imaging pixel 20, a column amplifier 109 assigned to one column, and the noise canceling circuit 4 in this solid-state imaging device.

The imaging pixel 20 includes a photodiode (PD) 8 that generates an electric charge by photoelectric conversion, a floating diffusion portion (FD) 10 that converts the electric charge generated by the PD 8 into a voltage, and a readout transistor 12 that reads out a signal corresponding to a potential of the FD 10. Between the PD 8 and the FD 10, a transfer transistor 9 is connected whose gate is connected to a charge transfer signal line 15 and that is controlled by means of a charge transfer signal. The FD 10 is connected to a pixel reset signal line 16 and to pixel driving power supply wiring 19 via a reset transistor 11 that is controlled by means of a pixel reset signal. A selection transistor 13 is connected at its gate terminal to a pixel selection signal line 17 and is controlled by means of a pixel selection signal. The readout transistor 12 is connected at its source terminal to the pixel driving power supply wiring 19 and at its drain terminal, via the selection transistor 13, to a vertical signal line 108 that reads out pixel signals, and a current source 14 is located at an end of the vertical signal line 108.

Next, the column amplifier 109 includes a column amplifier input capacitance 21, a column amplifier driving transistor 22, a column amplifier load transistor 23, a column amplifier reset transistor 24, and a current generating circuit 29. The column amplifier input capacitance 21 is connected at one terminal to the vertical signal line 108 and at the other terminal to a gate potential 25 of the column amplifier driving transistor 22, and transmits a variation in potential of the vertical signal line 108 to the column amplifier driving transistor 22. A column amplifier bias potential 28 is connected to a gate of the column amplifier load transistor 23, and the column amplifier load transistor 23 operates as a load of a grounded-source amplifier that is the column amplifier driving transistor 22. Between the gate potential 25 of the column amplifier driving transistor 22 and a column amplifier output potential 26, the column amplifier reset transistor 24 is connected whose gate terminal is connected to a column amplifier reset signal line 27 and that is controlled by a reset signal. The current generating circuit 29 is connected between a column amplifier power supply 30 and a ground 31.

The noise canceling circuit 4 includes a clamp capacitor element 35 that is connected at one terminal to the column amplifier output potential 26 of the column amplifier 109, a sample-holding capacitor element 36 that is connected between the other terminal of the clamp capacitor element 35 and a ground 31, and a clamp switch 37 that is connected between the other terminal of the clamp capacitor element 35 and a clamp potential 38, is connected at its gate terminal to a clamp switch signal line 39, and is controlled by a clamp switch signal.

Figure 3:
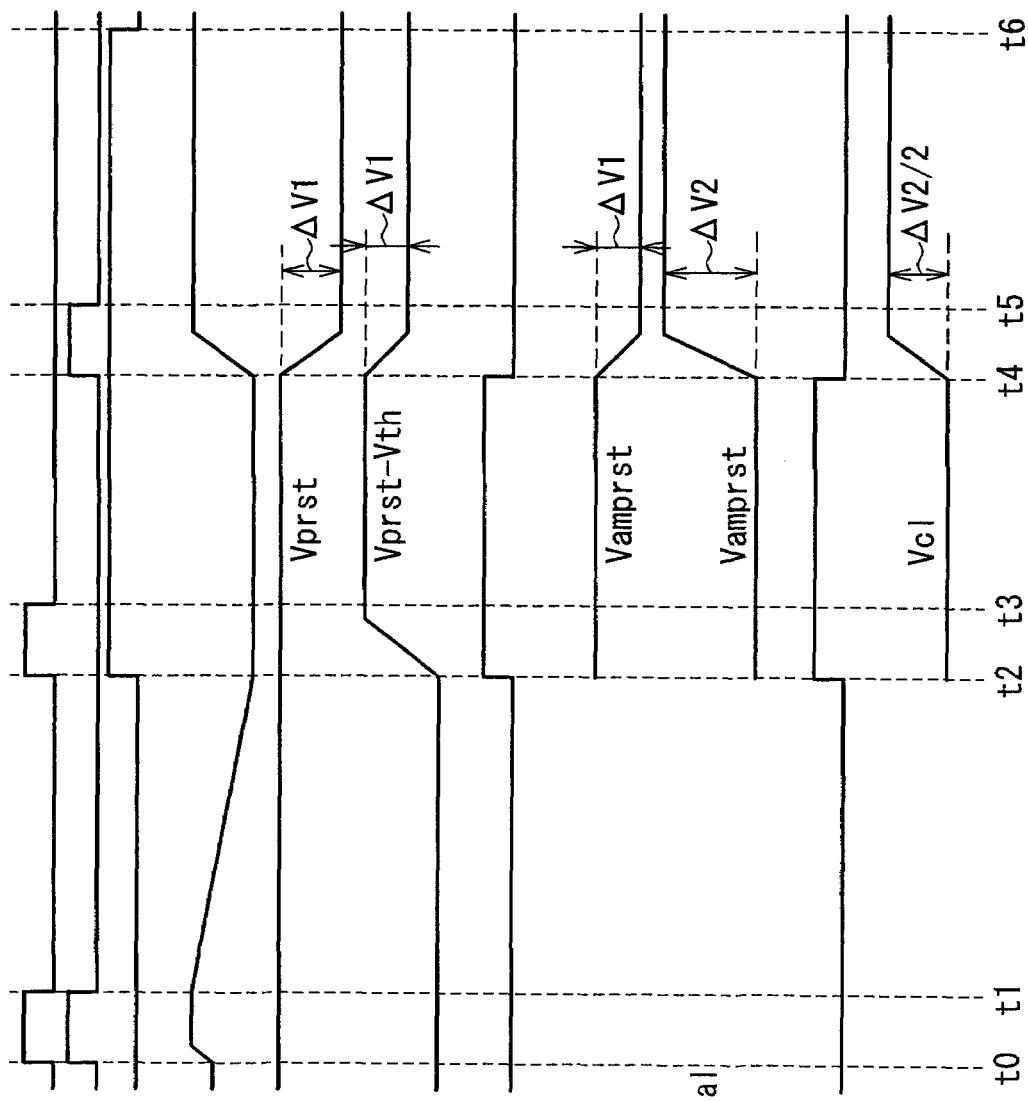
FIG. 3 is a timing chart showing an operation of the solid-state imaging device according to the first embodiment of the present invention.

The description is directed next to an operation of reading out a pixel signal by the imaging device according to this embodiment with reference to a timing chart shown in FIG. 3. At timing t0, a pixel reset signal potential of the pixel reset signal line 16 is brought to be at a H level, and thus a potential of the FD is reset to Vprst (=VDD−Vth). At the same time, a charge transfer signal potential of the charge transfer signal line 15 is brought to be at the H level, and thus an electric charge remaining in the PD is transferred to the FD side so that an accumulated charge in the PD becomes zero.

Next, at timing t1, each of the pixel reset signal potential and the charge transfer signal potential is brought back to be at a L level. This initiates accumulation of a photogenerated charge in the PD.

Next, at timing t2, the pixel reset signal potential is brought to be at the H level, and thus the potential of the FD is reset again to Vprst. At the same time, a pixel selection signal potential is brought to be at the H level, and thus a source follower amplifier composed of the readout transistor 12 and the current source 14 is formed, so that a potential Vprst—Vth is outputted to the vertical signal line 108. (Though this potential should be indicated as Vprst−Vth—α to be exact, α is omitted for ease of explanation.) Further, a column amplifier reset signal potential of the column amplifier reset signal line is brought to be at the H level, and thus each of the gate potential 25 of the column amplifier driving transistor 22 and the column amplifier output potential 26 is set to a reset potential Vamprst of the amplifier. Moreover, a clamp switch signal potential of the clamp switch signal line 39 is brought to be at the H level, and thus a potential of a sample-holding terminal 18 (SH potential) is set to the clamp potential 38 (Vcl).

Next, at timing t3, the pixel reset signal potential is brought to be at the L level.

Then, at timing t4, the column amplifier reset signal potential is brought to be at the L level, and thus the column amplifier 109 is brought to an amplification operation state. At the same time, the clamp switch signal potential is brought to be at the L level, and thus the SH potential is brought to a floating state. Moreover, the charge transfer signal potential is brought to be at the H level, and thus an electric charge accumulated in the PD 8 is transferred to the FD 10. As a result, the potential of the FD becomes Vprst−ΔV1, so that a signal potential outputted to the vertical signal line 108 lowers to Vprst−Vth−ΔV1. Herein, a value of ΔV1 is proportional to an electric charge accumulated in the PD 8. Due to the influence of this lowering of the potential, the gate potential 25 of the column amplifier driving transistor 22 lowers by ΔV1, and the column amplifier output potential rises by ΔV2. A value given by ΔV2/ΔV1 represents a gain of the column amplifier 109. Due to the influence of this rising of an output of the column amplifier 109, through the medium of the clamp capacitor element 35, the SH potential also increases from a dark-time output Vcl to a potential Vcl+ΔV2/2. Herein, it is assumed that the clamp capacitor element 35 and the sample-holding capacitor element 36 are equal in capacitance. The SH potential is read out to the outside, and a difference between the SH potential and the dark-time output Vcl is detected, thereby allowing a pixel signal to be read out.

The description is directed next to the current generating circuit 29. As shown in FIG. 2, the current generating circuit 29 includes a first adjustment transistor 32 and a second adjustment transistor 33. A gate of the second adjustment transistor 33 is connected to the column amplifier output potential 26, and thus an amount of an electric current that flows through the current generating circuit 29 is controlled by the column amplifier output potential 26. Specifically, when the column amplifier 109 is in a reset state, a gate potential of the second adjustment transistor 33 is low, so that almost no electric current flows through the current generating circuit 29. In a state where the reset state of the column amplifier 109 is released to put the column amplifier 109 into an amplification mode, when the gate potential 25 of the column amplifier driving transistor 22 begins to fall, the column amplifier output potential 26 rises, and thus a drain potential of the first adjustment transistor 32 rises to cause an increase in an electric current that flows through the current generating circuit 29. When the gate potential lowers further to such an extent that the drain potential of the first adjustment transistor 32 exceeds a current generating circuit bias potential 34, the first adjustment transistor 32 is shifted from a linear region to a saturation region to halt the increase in the electric current.

Figure 4:
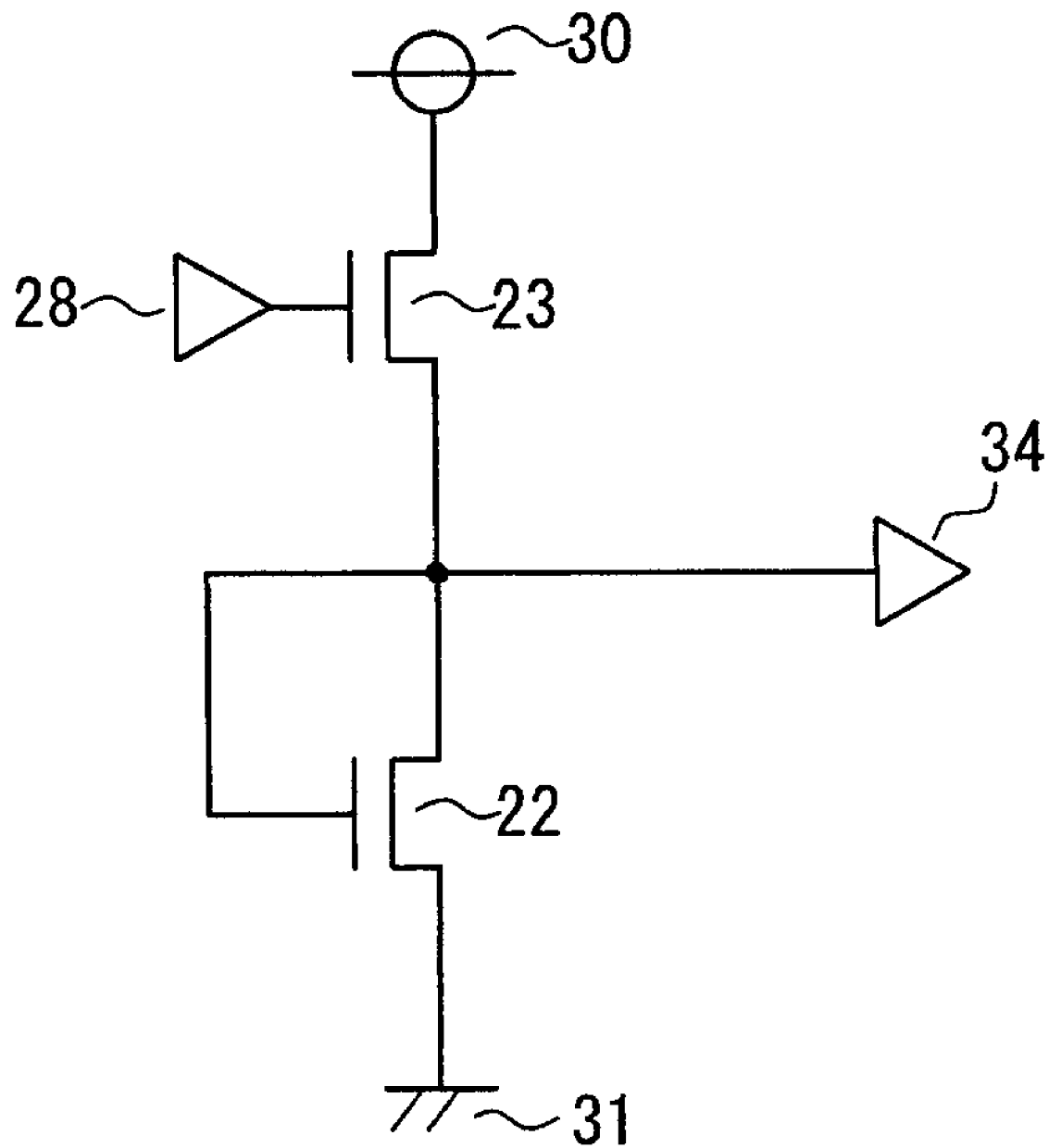
FIG. 4 is a circuit diagram showing a bias potential generating circuit in the solid-state imaging device according to the first embodiment of the present invention.

FIG. 4 is a circuit diagram showing a configuration of a bias potential generating circuit that applies a bias potential to the current generating circuit 29.

The bias potential generating circuit includes a driving transistor 22 and a load transistor 23, and is set so that its size and a bias potential 28 of the load transistor 23 are the same as in the column amplifier 109. Hence, in FIG. 4, they bear the same reference numerals as in the column amplifier 109. The driving transistor 22 is connected at its gate and drain, which means that a bias potential 28 becomes equal to the column amplifier reset potential Vamprst. Thus, a maximum current that flows through the current generating circuit 29 becomes almost equal to an electric current that flows when the column amplifier 109 is in a reset state. This bias potential generating circuit is not required to be provided in each column and may be shared by a plurality of column amplifiers.

Figure 5:
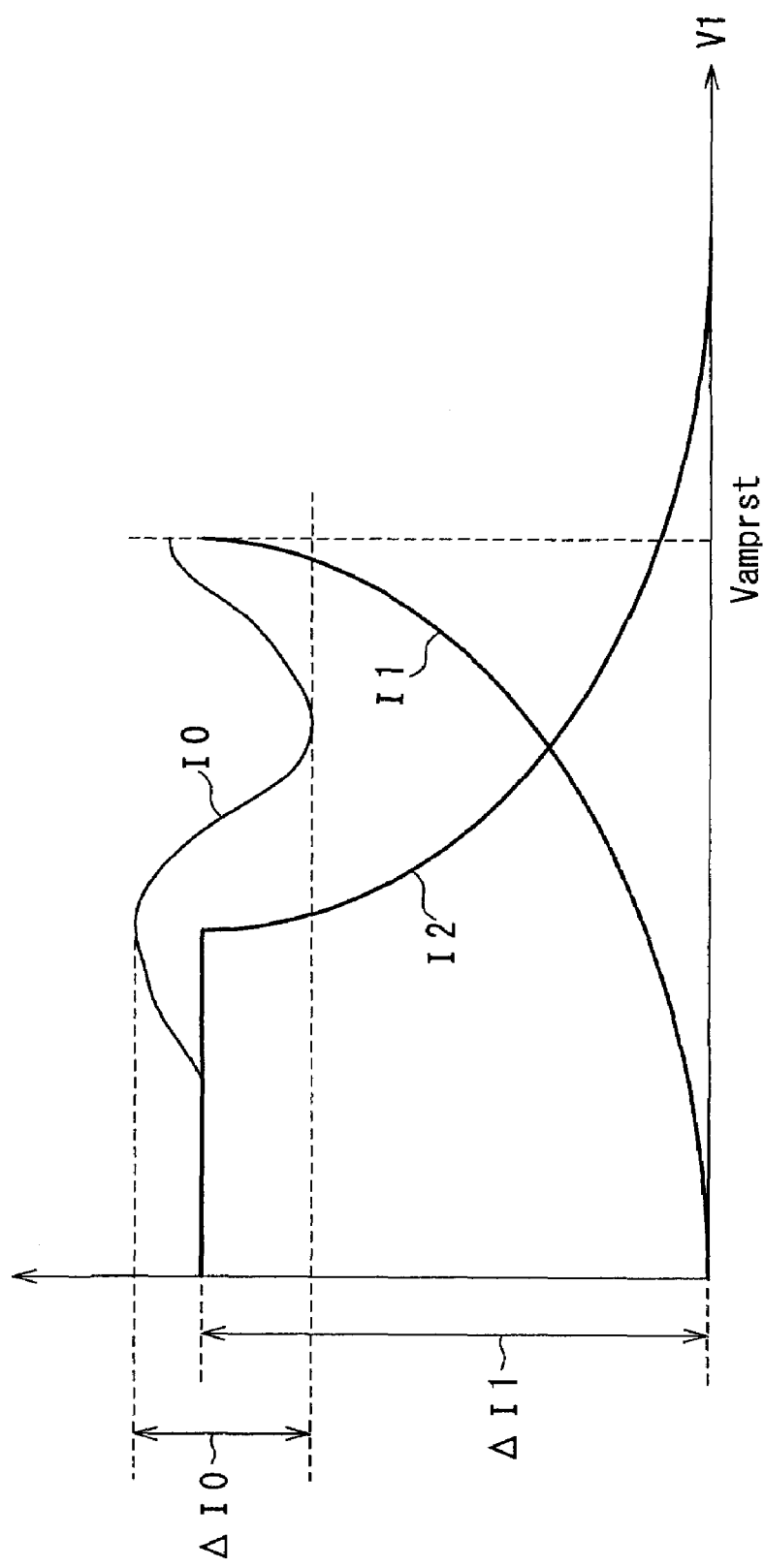
FIG. 5 is a diagram showing input level dependence of an electric current that flows through a column amplifier of the solid-state imaging device according to the first embodiment of the present invention.

FIG. 5 is a diagram showing the dependence of an electric current that flows through the column amplifier 109 with respect to the gate potential 25 of the column amplifier driving transistor 22. In the diagram, the vertical axis indicates an electric current, and the horizontal axis indicates the gate potential 25. Further, I1 indicates an electric current that flows through a main body of the amplifier, I2 indicates an electric current that flows through the current generating circuit, and I0 indicates a total electric current, which is the sum of these electric currents. The gate potential 25 of the driving transistor 22 is Vamprst at the maximum, and I1 becomes small as an optical signal becomes large and the gate potential lowers. On the other hand, I2 becomes large as the gate potential lowers. As a result, a variation in a value of I0 (ΔI0) that is the sum of the two electric current values is reduced considerably with respect to a variation in a value of I1 alone (ΔI1).

By this reduction of a variation in electric current, even when an image of a subject with high brightness is captured and thus an input signal of part of column amplifiers becomes large, the influence of a variation in electric current upon other column amplifiers at the periphery is limited, and thus the occurrence of a deviation in black level is suppressed, thereby allowing a high quality image to be obtained. Further, even when a value of an electric current that flows through a current generating circuit changes due to manufacturing variations or a variation in operational conditions, no influence is exerted upon the input/output characteristics of a column amplifier itself. This means that a solid-state imaging device that has large tolerances in manufacture and resistance to the environment can be realized.

In the foregoing description, an example was shown in which a grounded-source amplifier without feedback was used as a column amplifier. However, also in other types of amplifiers such as a differential amplifier, an amplifier with feedback and the like, a similar effect can be obtained by the use of a current generating circuit to which a characteristic of canceling out input dependence of an electric current in a main body of a column amplifier is imparted.

Second Embodiment

Figure 6:
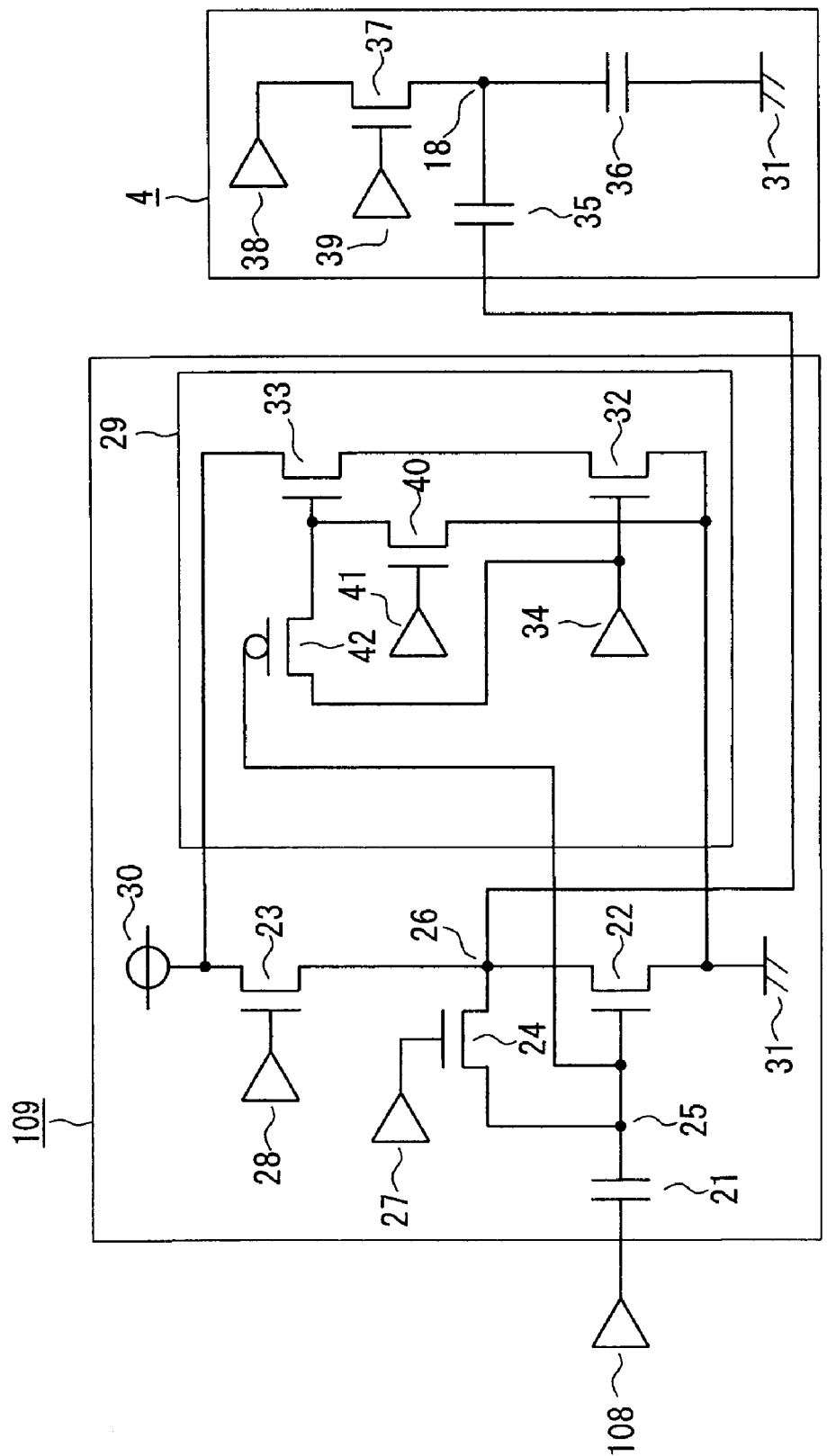
FIG. 6 is a circuit diagram showing a main portion of a solid-state imaging device according to a second embodiment of the present invention.

Next, a second embodiment of the solid-state imaging device according to the present invention will be described with reference to the appended drawings. FIG. 6 is a circuit diagram showing a column amplifier 109 and a noise canceling circuit 4 among components in a column circuit portion of a solid-state imaging device according to the second embodiment of the present invention. The configuration shown herein is the same as that of the above-described first embodiment shown in FIG. 2 except for a portion of a current generating circuit 29, and an operation of reading out a pixel signal also is similar to that in the above-described first embodiment. Hence, duplicate descriptions thereof are omitted.

The current generating circuit 29 includes a first adjustment transistor 32, a second adjustment transistor 33, a reset transistor 40, and a judgment transistor 42. The first adjustment transistor 32 and the second adjustment transistor 33 are connected serially between a column amplifier power supply 30 and a ground 31. The second adjustment transistor 33 switches, in accordance with its gate potential, whether or not the current generating circuit 29 passes an electric current between the column amplifier power supply 30 and the ground 31. An amount of an electric current to be passed is determined by a current generating circuit bias potential 34 that is connected to a gate of the first adjustment transistor 32. The reset transistor 40 is controlled by means of a current generating circuit reset signal 41, and sets the gate potential of the second adjustment transistor 33 to a L level. The judgment transistor 42 is connected between the current generating circuit bias potential 34 and a gate of the second adjustment transistor 33, and a gate of the judgment transistor 42 is connected to a gate potential 25 of a column amplifier driving transistor 22. When the gate potential 25 of the column amplifier driving transistor 22 becomes lower by Vth than the current generating circuit bias potential 34, the current generating circuit bias potential 34 is set at the gate of the adjustment transistor 33.

A circuit that generates the current generating circuit bias potential 34 has the same configuration as shown in FIG. 4. Therefore, as in the configuration shown in the first embodiment, the current generating circuit bias potential 34 becomes equal to a reset potential Vamprst of the column amplifier 109.

The description is directed next to an operation of the solid-state imaging device according to this embodiment. Concurrently with resetting of the column amplifier 109, the current generating circuit reset signal 41 is brought to be at a H level, and the gate potential of the second adjustment transistor 33 is brought to be at the L level. Next, the reset state of the column amplifier 109 is released to be shifted to an amplification step, and then, the current generating circuit reset signal 41 also is brought to be at the L level. When an input signal 108 to the column amplifier 109 is small, the judgment transistor 42 is in an OFF state, and thus the gate potential of the second adjustment transistor 33 remains at the L level, so that no electric current flows through the current generating circuit 29. On the other hand, when the input signal 108 to the column amplifier 109 is larger than Vth, the judgment transistor 42 is turned on, and thus the gate potential of the second adjustment transistor 33 is set to Vamprst, causing an electric current to flow through the current generating circuit 29.

Figure 7:
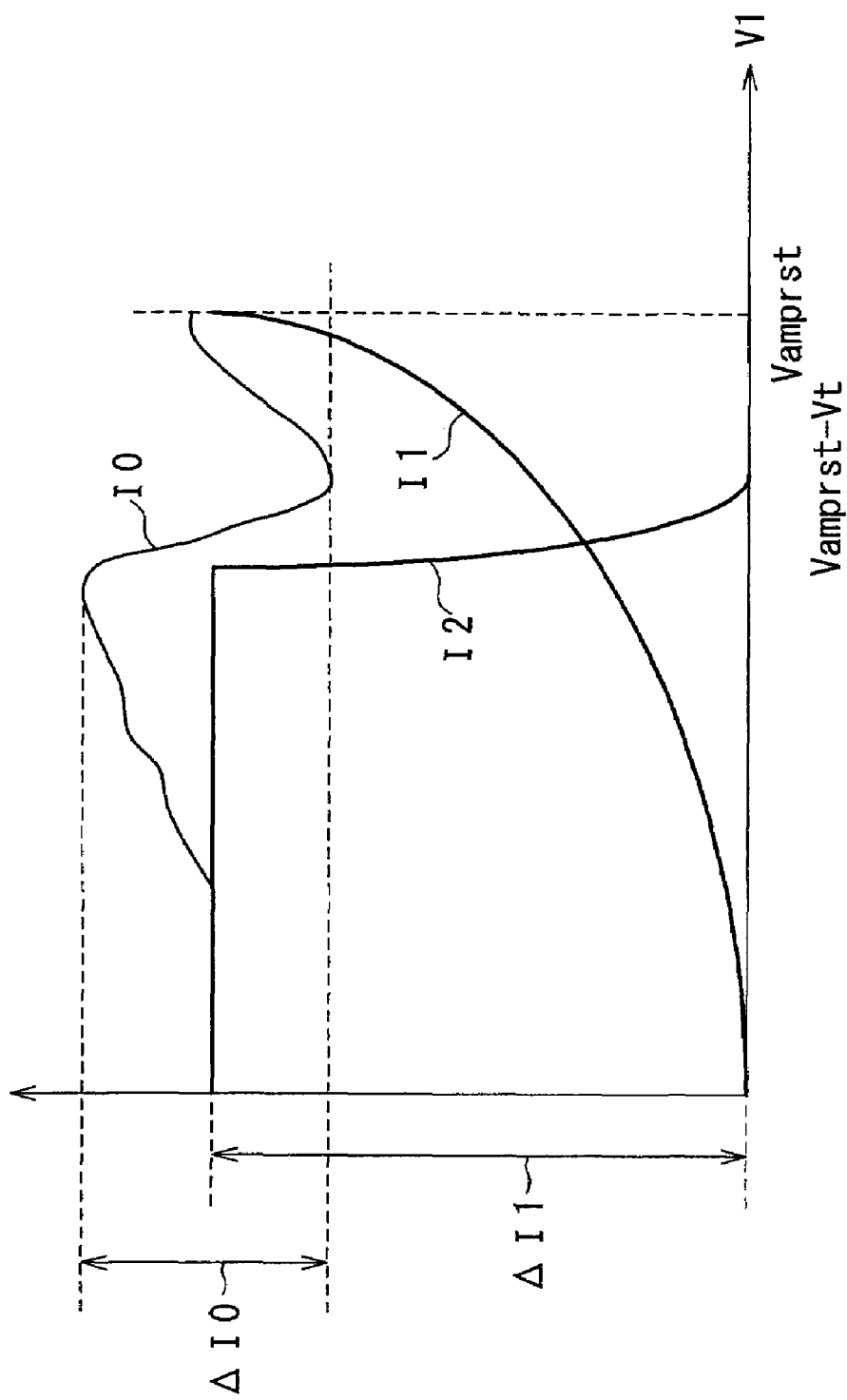
FIG. 7 is a diagram showing input level dependence of an electric current that flows through a column amplifier of the solid-state imaging device according to the second embodiment of the present invention.

FIG. 7 shows the dependence of an electric current that flows through the column amplifier 109 with respect to the gate potential 25 of the column amplifier driving transistor 22 in the solid-state imaging device according to this second embodiment. An electric current I1 that follows through a main body of the column amplifier 109 is largest at Vamprst and becomes small abruptly when an input lowers. On the other hand, in the current generating circuit 29, when the gate potential is Vamprst, an electric current that flows therethrough has a value of zero, while when the gate potential becomes lower than Vamprst−Vth, it becomes equal in magnitude to an electric current that flows when the column amplifier 109 is in a reset state. By this effect of a current generating circuit, a variation in total electric current of the column amplifier 109 (ΔI0) becomes smaller compared with a variation in electric current of the column amplifier alone (ΔI1).

As described above, the second embodiment explained an example in which the current generating circuit 29 operates in such a manner as to switch a correction current in accordance with one node potential that is the gate potential 25 of the column amplifier driving transistor 22 in the column amplifier 109. Further, in this case, the switching of a correction current is performed relative to an output of a bias potential generating circuit that applies a bias potential to a current correcting circuit. According to this configuration, similarly to the configuration shown in the first embodiment, there can be obtained an effect of being able to realize a solid-state imaging device that can provide high quality images by reducing a variation in electric current in a column amplifier, and has large tolerances in manufacture and resistance to the environment, which is the same as the effect of the above-described first embodiment.

In the foregoing description, an example was shown in which a grounded-source amplifier without feedback was used as a column amplifier. However, even in other types of amplifiers such as a differential amplifier, an amplifier with feedback and the like, a similar effect to the above-described effect can be obtained by the following configuration. That is, it is judged whether or not an input to a column amplifier is in such a level as to allow a variation in an electric current that flows through the column amplifier to be in a limited range, and when the variation exceeds the range of a variation in the electric current, an electric current that flows through a current generating circuit is switched so as to cancel out the variation in the column amplifier.

Furthermore, as a node in a column amplifier with respect to which an output of a current generating circuit is switched, aside from the one described above, a column amplifier output potential 26, a vertical signal line 108 or the like is used, and it also is possible to use a plurality of these nodes. Moreover, the switching in the current generating circuit also can be performed, instead of relative to a potential of a bias generating circuit of the current generating circuit, relative to a judgment potential supplied from the outside, an output of a monitor circuit with respect to a column amplifier operation current or the like, and the same effect can be obtained in such a case. In addition, the number of levels of a correction current to be switched is not limited only to the above-described two levels and may be three or more levels.

Third Embodiment

Figure 8:
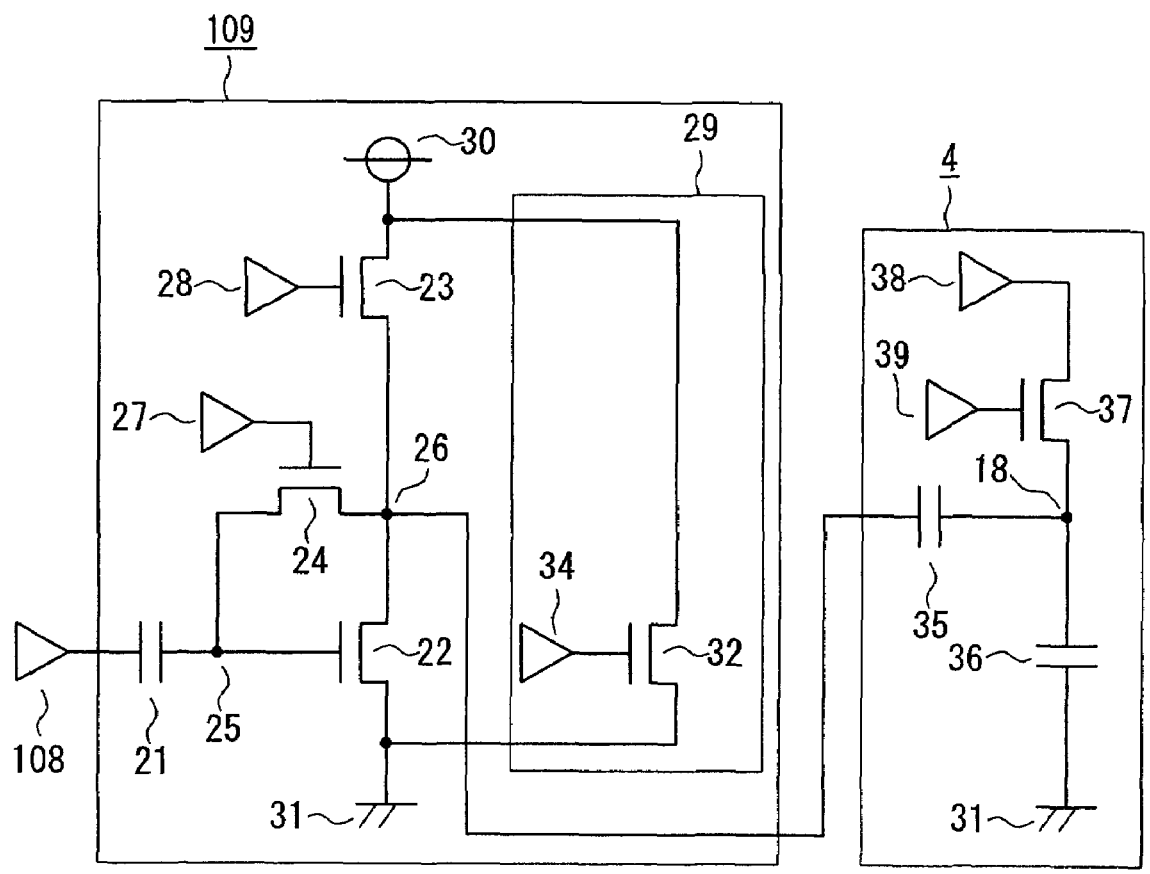
FIG. 8 is a circuit diagram showing a main portion of a solid-state imaging device according to a third embodiment of the present invention.

In the following, a third embodiment of the solid-state imaging device according to the present invention will be described with reference to the appended drawings. FIG. 8 is a circuit diagram showing a column amplifier 109 and a noise canceling circuit 4 among components in a column circuit portion of a solid-state imaging device according to the third embodiment of the present invention. As in the second embodiment, the configuration of this embodiment is the same as that of the solid-state imaging element according to the first embodiment shown in FIG. 2 except for a portion of a current generating circuit 29, and an operation of reading out a pixel signal also is similar to that in the first embodiment. Hence, duplicate descriptions thereof are omitted herein.

In this embodiment, the current generating circuit 29 includes only a first adjustment transistor 32 and not a second adjustment transistor. Because of this, a constant electric current that is determined by a level of a current generating circuit bias potential 34 connected to a gate of the first adjustment transistor 32 flows through the current generating circuit 29.

Figure 9:
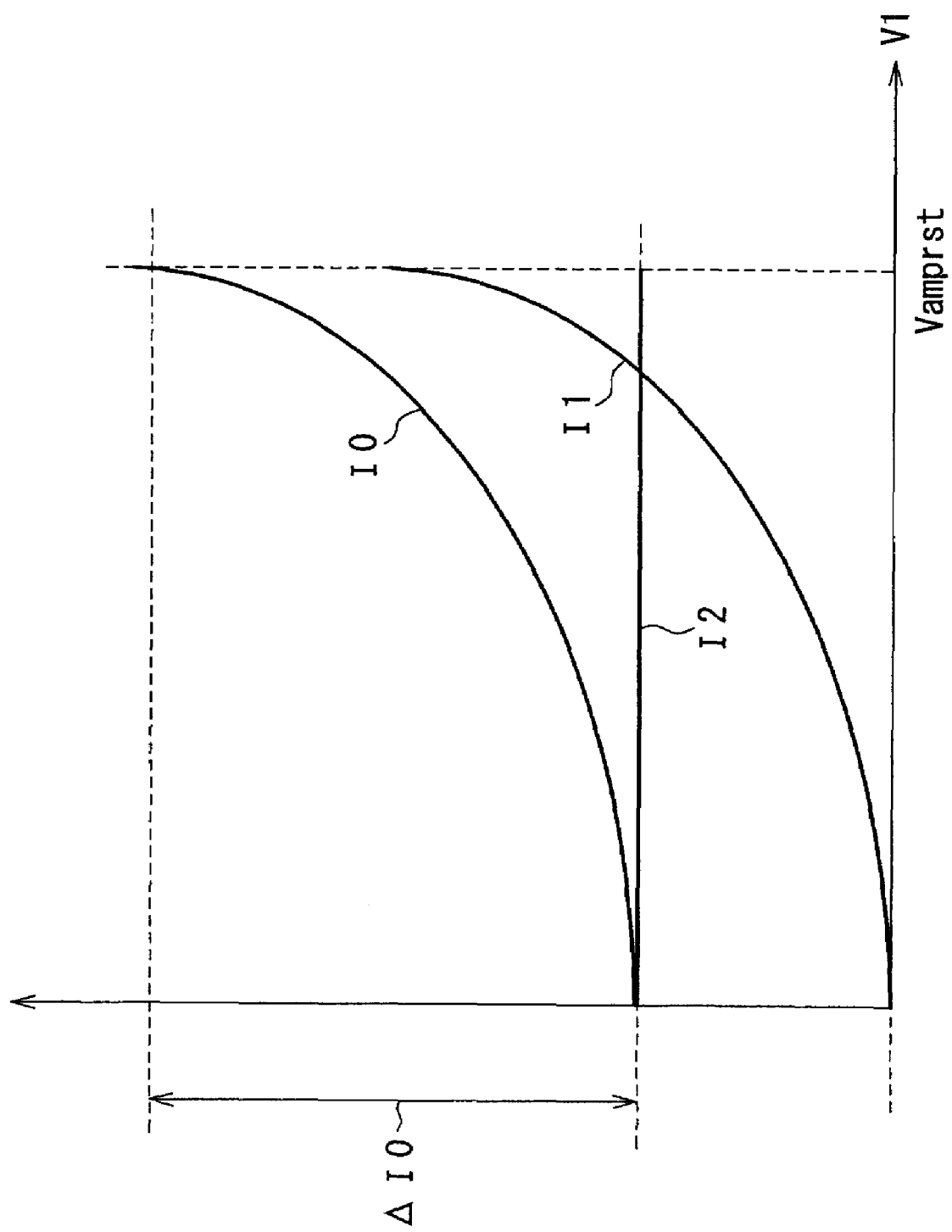
FIG. 9 is a diagram showing input level dependence of an electric current that flows through a column amplifier of the solid-state imaging device according to the third embodiment of the present invention.

FIG. 9 is a diagram showing the dependence of an electric current that flows through a column amplifier with respect to a gate potential 25 of a column amplifier driving transistor 22 in the case of this embodiment. An electric current I1 that flows through a main body of the column amplifier is largest at Vamprst and becomes small abruptly when an input lowers. On the other hand, in the current generating circuit 29, a constant electric current I2 flows therethrough irrespective of the gate potential. A coefficient of variation of a total electric current I0 in the column amplifier portion (ΔI0), which is a combination of these electric currents, is smaller compared with a coefficient of variation of the electric current in the amplifier alone (ΔI1).

As described above, even with a current generating circuit configured so as to allow a constant electric current to be passed therethrough, similarly to the configurations shown in the above-described first and second embodiments, a solid-state imaging device can be realized that can provide high quality images and has large tolerances in manufacture and resistance to the environment. Again as in the above-described embodiments, also when using other types of amplifiers such as a differential amplifier, an amplifier with feedback and the like, a similar effect can be obtained.

Fourth Embodiment

Figure 10:
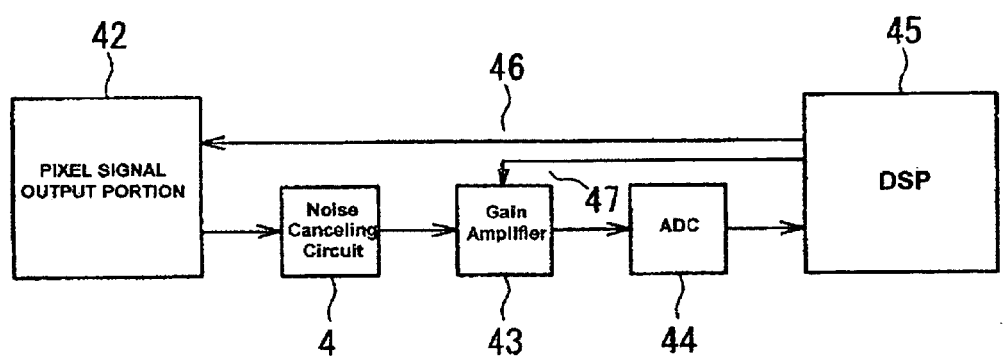
FIG. 10 is a block diagram showing a solid-state imaging device according to a fourth embodiment of the present invention.

In the following, a fourth embodiment of the present invention will be described with reference to the appended drawings. FIG. 10 is a block diagram showing a configuration at a further periphery of a solid-state imaging device according to the fourth embodiment of the present invention. When the pixel array and the column amplifier constituting the solid-state imaging device described in each of the above-described first to third embodiments are assumed to form a pixel signal output portion 42, a pixel signal outputted therefrom passes through a noise canceling circuit 4, a gain amplifier 43, and an analog/digital converter (ADC) 44 to be inputted to a digital signal processor (DSP) 45. The DSP 45 performs image processing with respect to the inputted pixel signal, and outputs an ON/OFF signal 46 that performs ON/OFF control of a current generating circuit 29 included in a column amplifier 109 in the pixel signal output portion 42, which will be described later, and a gain setting signal 47 that controls gain setting of the gain amplifier 43.

Figure 11:
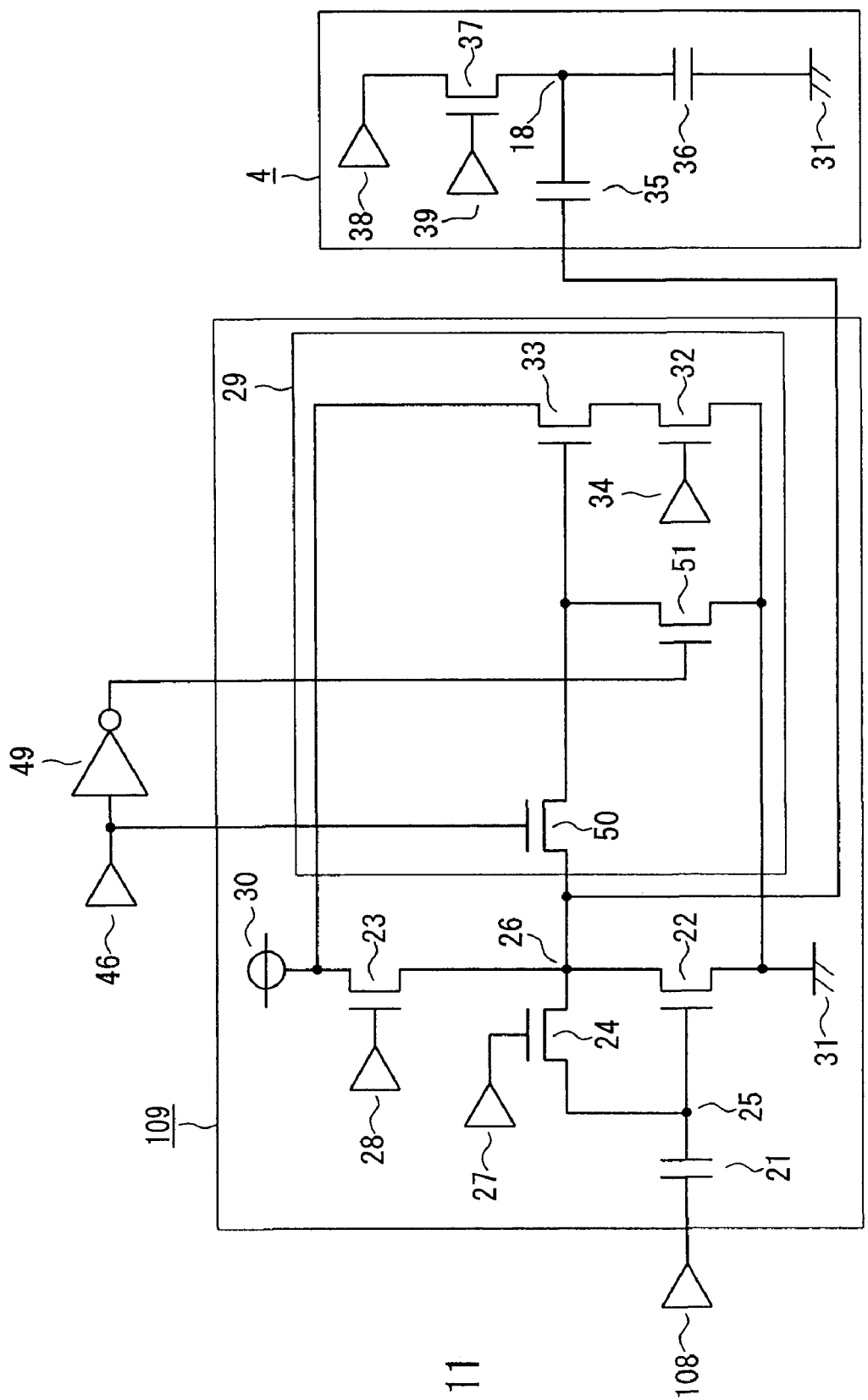
FIG. 11 is a circuit diagram showing a column amplifier portion of a solid-state imaging element constituting the solid-state imaging device according to the fourth embodiment of the present invention.

FIG. 11 is a circuit diagram showing the column amplifier 109 and the noise canceling circuit 4 among components in a column circuit portion of a solid-state imaging element according to this embodiment. This configuration differs from the configuration shown in FIG. 2 in that, in the current generating circuit 29, a current generating circuit input transistor 50 is inserted between a column amplifier output potential 26 and a gate of a second adjustment transistor 33, and in that a current generating circuit halting transistor 51 is inserted between the same gate of the second adjustment transistor 33 and a ground 31. The ON/OFF signal 46 is connected to a gate of the current generating circuit input transistor 50, and a signal obtained by inversion of the ON/OFF signal 46 by an inverter 49 is connected to a gate of the current generating circuit halting transistor 51. When the ON/OFF signal 46 is at a H level, the current generating circuit 29 is brought to an ON state in which it operates as described in the first embodiment, while when the ON/OFF signal 46 is at a L level, the gate of the second adjustment transistor 33 is fixed to the ground 31, so that the current generating circuit 29 is brought to an OFF state in which no electric current is passed therethrough.

This ON/OFF signal 46 is controlled in association with the gain setting signal 47 of the gain amplifier. Specifically, when a gain is set so as to be small, the current generating circuit 29 is turned off, while when the gain is set so as to be large, the current generating circuit 29 is turned on. When the gain is set so as to be small, since the influence of a variation in electric current of the column amplifier 109 upon image quality is limited, it is efficient to turn off the current generating circuit 29 thereby to reduce current consumption. On the other hand, when the gain is set so as to be large, the function of the current generating circuit 29 serves to achieve improved image quality. As described above, this embodiment serves to realize a solid-state imaging device that achieves high image quality and low power consumption.

Furthermore, in addition to the above, it also is effective in reducing power consumption of a current generating circuit to switch an ON/OFF state of the current generating circuit itself based on an input signal level or an output signal level of a column amplifier. Specifically, this could be performed in the following matter. That is, when an input signal level is large, the current generating circuit 29 is turned off, while when the input signal level is small, the current generating circuit 29 is turned off. Also in the case of using an output signal level, switching could be performed in a similar manner to this case of using an input signal level.

In FIG. 10, the solid-state imaging device is shown to be a combination of individual components that are separated into blocks. However, these components in a circuit potion as a whole or a plurality of blocks may be integrated into an IC. Further, the gain amplifier 43 shown in FIG. 10 may be an analog element, or alternatively, it also is possible to perform amplification by digital processing after performing A/D conversion.

Moreover, in this embodiment, an example was shown in which ON/OFF switching of a current generating circuit itself is controlled by means of the ON/OFF signal 46 in association with gain setting. However, this control also may be performed by other methods, such as for example, in accordance with a state of an imaging camera. For example, in a digital still camera, the control could be performed in a manner that, during a monitor operation thereof, a current generating circuit is turned off, while when an image to be recorded is captured, the current generating circuit is turned on.

Fifth Embodiment

Figure 12:
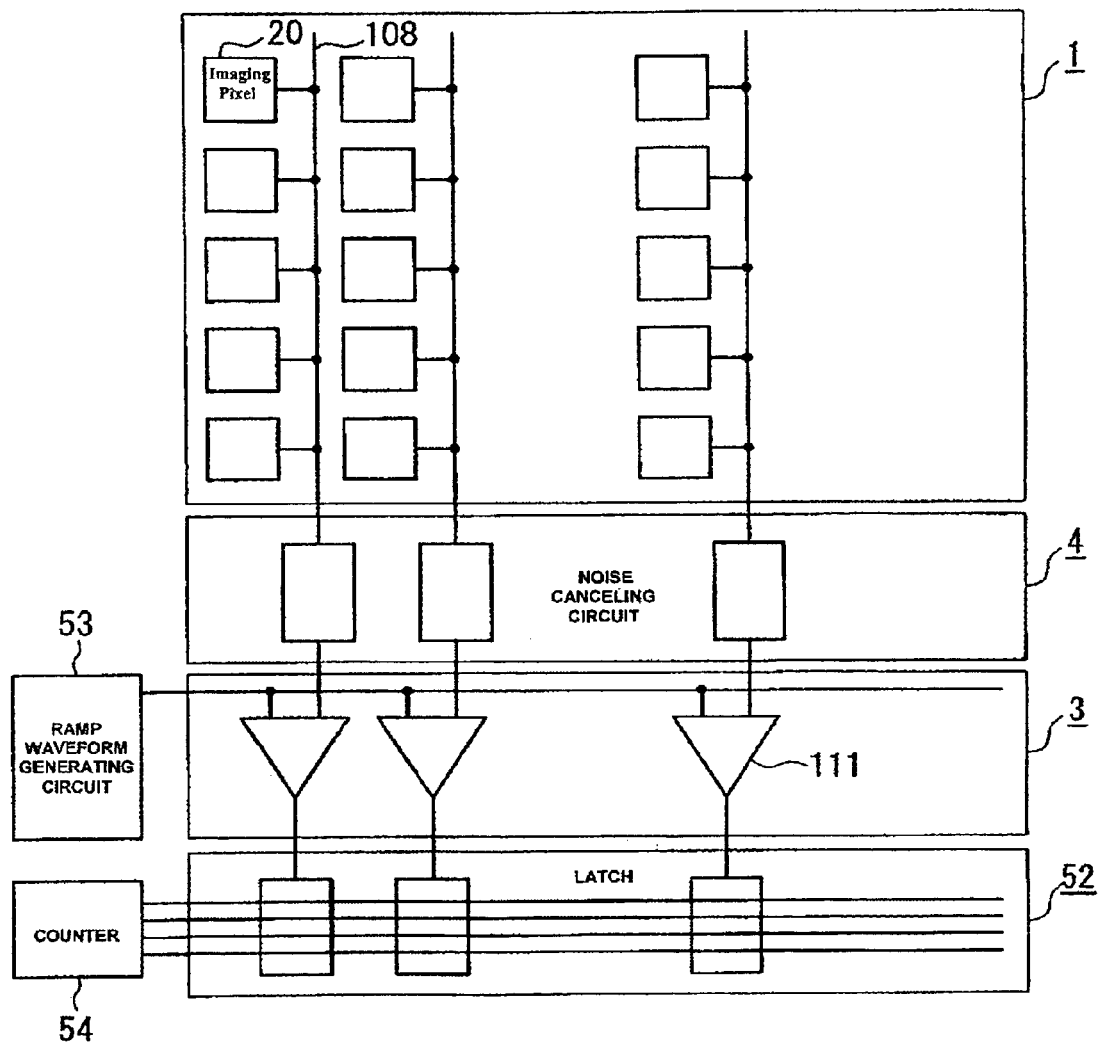
FIG. 12 is a block diagram showing a solid-state imaging element according to a fifth embodiment of the present invention.

The following describes a fifth embodiment of the present invention with reference to the appended drawings. FIG. 12 is a block diagram of a solid-state imaging device according to the fifth embodiment of the present invention, which has a configuration in which A/D conversion is performed so as to correspond to each column in a pixel array 1.

A pixel signal outputted from each of imaging pixels 20 of the pixel array 1 passes through a vertical signal line 108 to reach a noise canceling circuit 4 in which correction of an output offset of each pixel is performed, and then is inputted to one of input terminals of a differential column amplifier 111 that is formed in a column amplifier-arranged portion 3. An output of a ramp waveform generating circuit 53 is inputted to the other of the terminals of the differential column amplifier 111. The differential column amplifier 111 has a high amplification factor and functions as a comparator that compares the respective magnitudes of two inputs. Specifically, when a ramp waveform is larger than a pixel signal, the differential column amplifier 111 outputs a L signal. Next, in each column, a 4-bit latch 52 is provided, and an output of a 4-bit counter 54 has been inputted thereto. Further, an output of the column amplifier is connected to a writing signal terminal of the latch 52. When a writing signal changes in level from a H level to a L level, input data is written to the latch 52.

Figure 13:
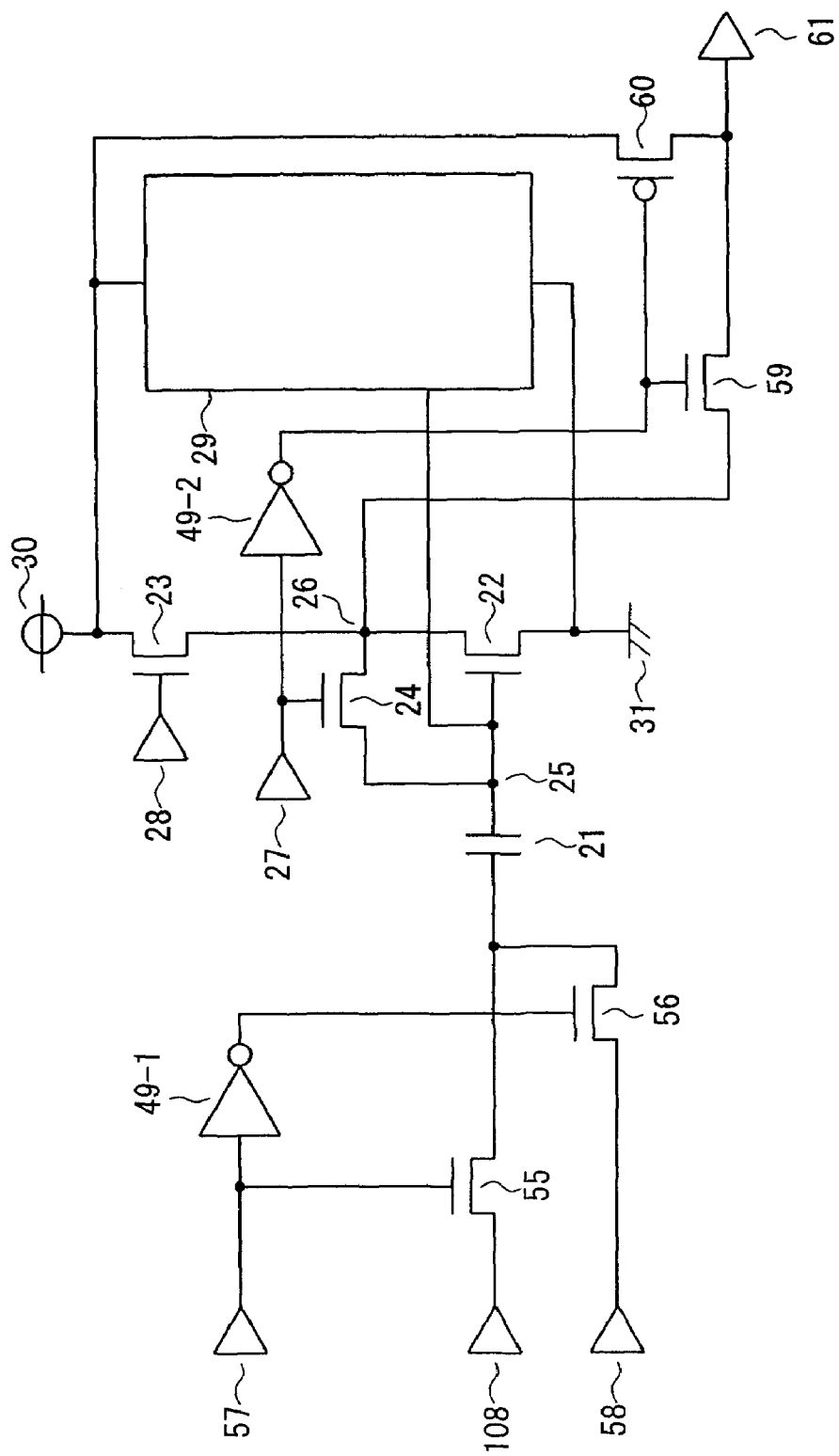
FIG. 13 is a circuit diagram showing a column amplifier of the solid-state imaging element according to the fifth embodiment of the present invention.

FIG. 13 shows a circuit configuration of the differential column amplifier 111 having the above-described configuration. An input from the vertical signal line 108 of the pixel array is connected to a column amplifier input capacitance 21 via a first input switch 55, and a ramp waveform 58 from the ramp waveform generating circuit 53 is connected to the column amplifier input capacitance 21 via a second input switch 56. These are inputted selectively by means of an input switching signal 57 and an inversion signal thereof generated by a first inverter 49-1. A column amplifier output potential 26 is connected to an output terminal 61 via an output switch 59. An inversion signal of an amplifier reset signal 27 is connected to a gate of the output switch 59. Further, an output level fixing switch 60 is inserted between the output terminal 61 and a column amplifier power supply 30. The inversion signal of the column amplifier reset signal from a column amplifier reset signal line 27 is connected also to a gate of the output level fixing switch 60, thus providing a configuration in which only either one of the output switch 59 and the output level fixing switch 60 is turned on. Moreover, a current generating circuit 29 is disposed between the column amplifier power supply 30 and a ground 31. A gate potential 25 of a column amplifier driving transistor 22 also is connected to the current generating circuit 29. Similarly to the second embodiment, only when the gate potential 25 of the column amplifier driving transistor 22 is low, does an electric current flow through the current generating circuit 29.

Figure 14:
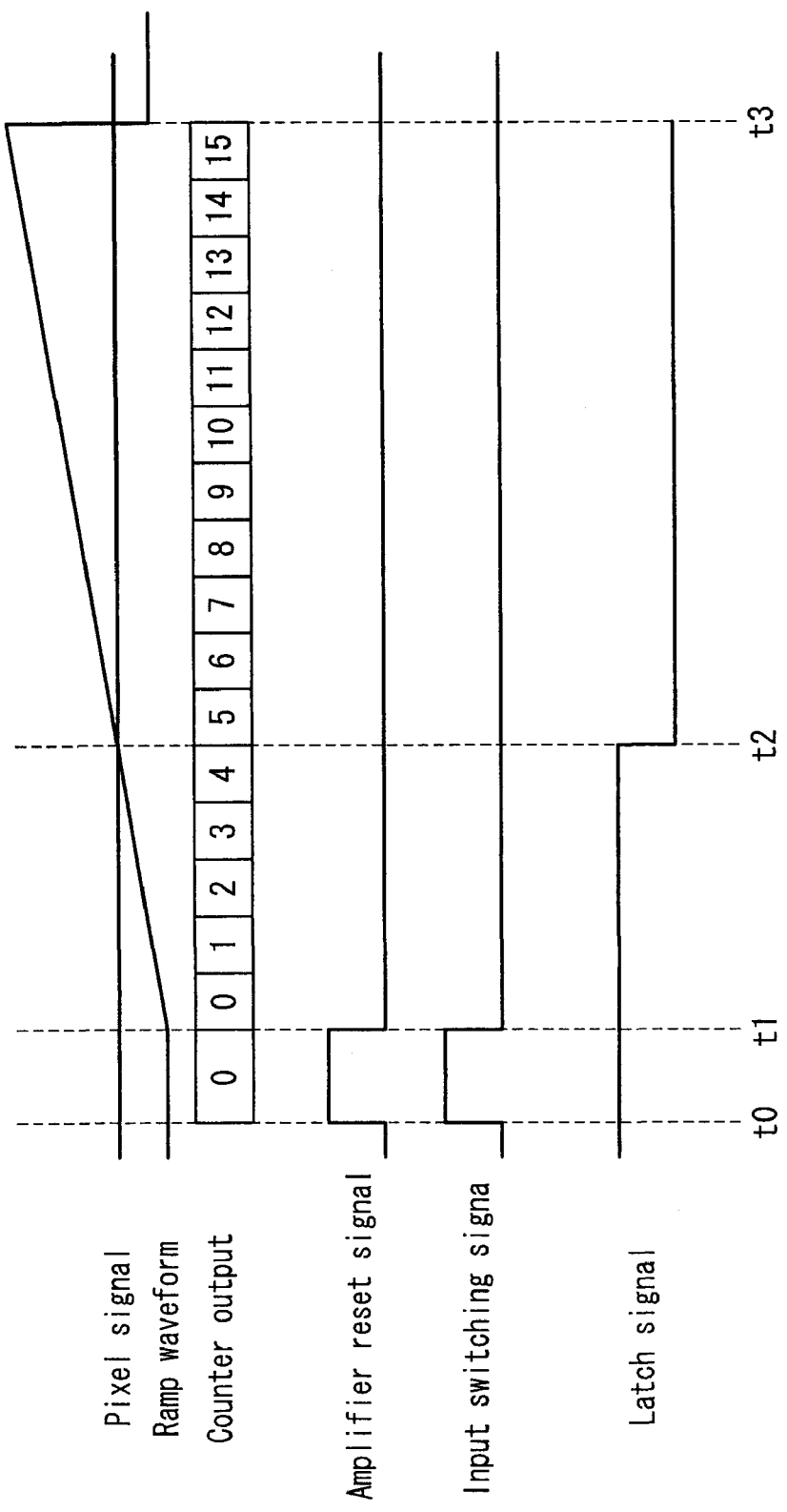
FIG. 14 is a timing chart showing an operation of the solid-state imaging element according to the fifth embodiment of the present invention.
Figure 15:
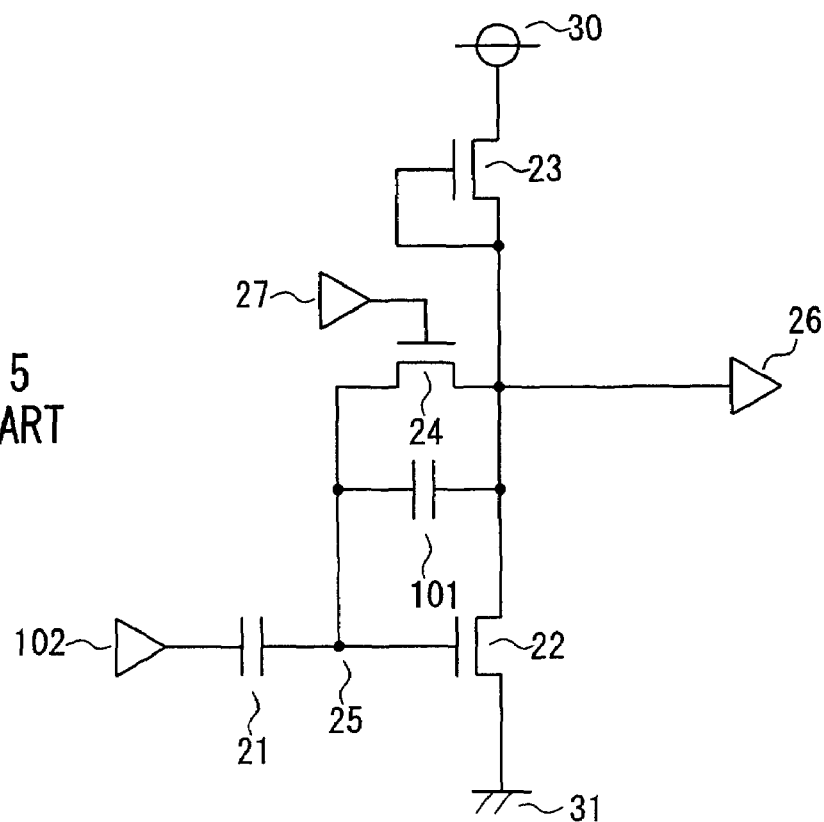
FIG. 15 is a circuit diagram showing an example of a configuration of a column amplifier in a conventional solid-state imaging device.
Figure 16:
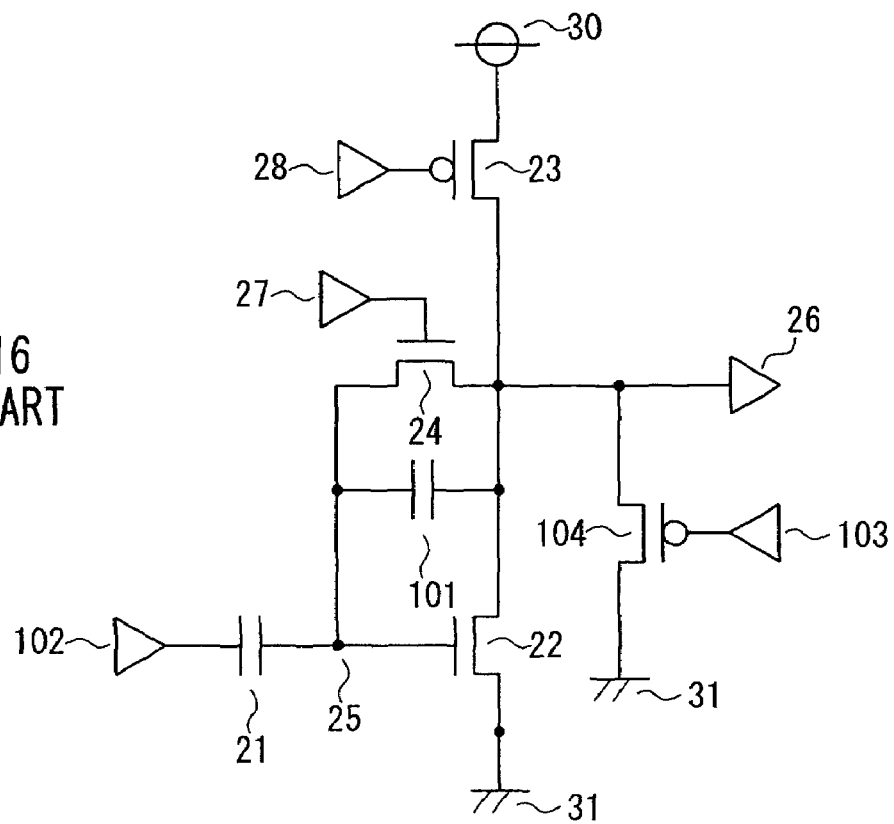
FIG. 16 is a circuit diagram showing another example of the configuration of the column amplifier in the conventional solid-state imaging device.
Figure 17:
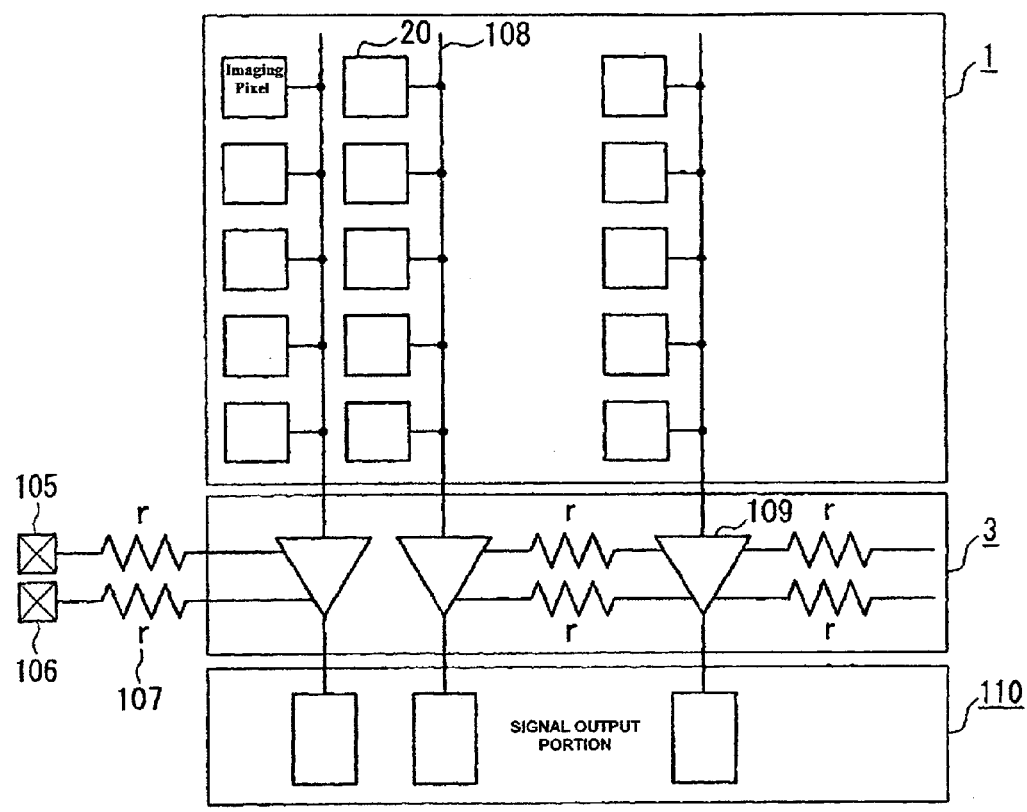
FIG. 17 is a diagram showing an arrangement pattern of column amplifiers in a solid-state imaging device.

The description is directed next to an A/D conversion operation with reference to a timing chart shown in FIG. 14. First, at timing t0, a pixel signal is inputted, the input switching signal is set to a H level, and the amplifier reset signal also is set to the H level. When the differential column amplifier 111 is in a reset state, the pixel signal is inputted thereto and its level is kept in the input capacitance. In an output portion, the level fixing switch side is turned on, and thus the output terminal is brought to be at the H level. Further, a ramp waveform is set to a minimum value of the pixel signal, and a counter is set to zero.

Next, at timing t1, the input switching signal is set to a L level, and the amplifier reset signal also is set to the L level. At this time, a reset state of the amplifier is released, and a ramp waveform is inputted. The ramp waveform is at a level lower than that of the pixel signal, and thus the gate potential 25 of the driving transistor 22 becomes lower than Vamprst, so that the column amplifier output potential is brought to be at the H level. Though in the output portion, the output switch side turns on, since the column amplifier output potential is at the H level, the output terminal also is held at the H level. Further, the ramp waveform starts rising in level. A gradient of the rising is set so as to attain a maximum value at timing t3. The counter also is counted up in synchronization with the rising of the ramp waveform.

At timing t2, the ramp waveform becomes larger than the pixel signal, so that the column amplifier output is switched to be at the L level, and a counter value at that time is written to the latch. Since the rising of the ramp waveform is in synchronization with the counting up as described earlier, a digital value written to the latch is a value corresponding to the pixel signal. In each column, the above-described operation is performed in parallel, and every set of analog pixel signals obtained from one row is subjected to A/D conversion in parallel and kept in the latches in the corresponding columns, respectively.

In this embodiment, a variation in electric current of the differential column amplifier 111 that functions as a comparator is reduced by the action of the current generating circuit 29. This can avoid a phenomenon in which amplifiers interfere with one another via a parasitic resistance of a thin wiring as common power supply wiring, and thus A/D conversion can be carried out with high precision.

In the foregoing description, a case was shown in which an integrating A/D converter was provided in each column. However, also in the case of using other types of A/D converters each including an element with the amplifier function, a similar explanation could be made.

Even when capturing an image of a subject with high precision, the solid-state imaging device according to the present invention prevents the occurrence of a deviation in black level at a periphery of the subject, and can realize a camera that provides an extended operational environment and achieves stable image quality. Thus, this solid-state imaging device is applied usefully to a digital still camera, a video camera, a surveillance camera and the like, which are required to provide high resolution and high quality images.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A solid-state imaging device, comprising:
a pixel array in which imaging pixels are arranged in row and column directions;
a plurality of vertical signal lines, each of which commonly outputs signals from part of the imaging pixels that is aligned in each column of the pixel array; and
a plurality of column amplifiers that are provided in a one-to-one correspondence with the plurality of vertical signals lines,
wherein between a column amplifier power supply and a ground in each of the plurality of column amplifiers, a current generating circuit is provided that generates a correction current in such a direction as to cancel out a variation in an operation current of each of the plurality of column amplifiers.

2. The solid-state imaging device according to claim 1, wherein with respect to a current value that is a sum of values of the operation current and the correction current, a variation in the current value that occurs in accordance with a level of an input signal inputted to each of the plurality of column amplifiers is smaller than a variation in the operation current.

3. The solid-state imaging device according to claim 2, wherein a bias potential generating circuit that applies a bias potential to the current generating circuit has a circuit configuration similar to a circuit configuration of each of the plurality of column amplifiers.

4. The solid-state imaging device according to claim 1, wherein in accordance with a potential at one or a plurality of nodes in each of the plurality of column amplifiers, the current generating circuit switches between two or more levels of the correction current.

5. The solid-state imaging device according to claim 4, wherein levels of the correction current are switched relative to an output of a bias potential generating circuit.

6. The solid-state imaging device according to claim 1, wherein the current generating circuit is configured so that a constant electric current is passed through the current generating circuit.

7. The solid-state imaging device according to claim 1, wherein a function of switching between ON/OFF states of the current generating circuit itself is provided.

8. The solid-state imaging device according to claim 7, wherein the ON/OFF states of the current generating circuit itself are switched based on a level of an input signal or an output signal of each of the plurality of column amplifiers.

9. The solid-state imaging device according to claim 7, further comprising:
an analog signal processing portion that includes a gain function; and
a control portion that controls the device as a whole,
wherein the ON/OFF states of the current generating circuit itself are switched in accordance with gain setting by the analog signal processing portion.

10. The solid-state imaging device according to claim 1, wherein a plurality of column analog/digital converters are provided with respect to outputs of the plurality of column amplifiers, respectively.

11. A solid-state imaging device, comprising:
a pixel array in which imaging pixels are arranged in row and column directions;
a plurality of vertical signal lines, each of which commonly outputs signals from part of the imaging pixels that is aligned in each column of the pixel array; and
a plurality of column analog/digital converters that are provided in a one-to-one correspondence with the plurality of vertical signal lines,
wherein between each of the column analog/digital converters and a ground, a current generating circuit is provided that generates a correction current in such a direction as to cancel out a variation in an operation current of the each of the column analog/digital converters.

* * * * *